(12) United States Patent
Takada et al.

(10) Patent No.: US 10,215,901 B2
(45) Date of Patent: Feb. 26, 2019

(54) POLARIZER, POLARIZING PLATE, AND METHOD OF PRODUCING POLARIZER

(71) Applicant: NITTO DENKO CORPORATION, Ibaraki-shi, Osaka (JP)

(72) Inventors: Katsunori Takada, Ibaraki (JP); Daisuke Ogomi, Ibaraki (JP); Shinobu Nagano, Ibaraki (JP); Eiko Suefusa, Ibaraki (JP); Yoshitsugu Kitamura, Ibaraki (JP); Hiroki Kuramoto, Ibaraki (JP); Youichirou Sugino, Ibaraki (JP); Keisuke Kimura, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 135 days.

(21) Appl. No.: 15/338,975

(22) Filed: Oct. 31, 2016

(65) Prior Publication Data

US 2017/0123125 A1 May 4, 2017

(30) Foreign Application Priority Data

Nov. 4, 2015 (JP) .................................. 2015-216472

(51) Int. Cl.
| | |
|---|---|
| *G02B 1/08* | (2006.01) |
| *G02B 5/30* | (2006.01) |
| *B32B 3/24* | (2006.01) |
| *B32B 5/14* | (2006.01) |
| *B32B 3/26* | (2006.01) |
| *G02B 1/14* | (2015.01) |

(Continued)

(52) U.S. Cl.
CPC ............ *G02B 5/3033* (2013.01); *B32B 3/266* (2013.01); *B32B 5/142* (2013.01); *B32B 5/147* (2013.01); *G02B 1/08* (2013.01); *G02B 1/14* (2015.01); *B32B 27/306* (2013.01); *B32B 2038/042* (2013.01); *B32B 2038/047* (2013.01); *B32B 2307/402* (2013.01); *B32B 2307/42* (2013.01); *B32B 2329/04* (2013.01); *B32B 2551/00* (2013.01)

(58) Field of Classification Search
None
See application file for complete search history.

(56) References Cited

U.S. PATENT DOCUMENTS 2,185,018 A * 12/1939 Sauer .................... G02B 5/3033
156/99
2,203,687 A * 6/1940 Mahler .................. G02B 27/26
352/58

(Continued)

FOREIGN PATENT DOCUMENTS

| FR | 2736444 A1 * | 1/1997 | ............... G02C 7/12 |
| GB | 476023 A * | 11/1937 | ........... G02B 5/3033 |

(Continued)

*Primary Examiner* — Jeffrey A Vonch
(74) *Attorney, Agent, or Firm* — Westerman, Hattori, Daniels & Adrian, LLP

(57) ABSTRACT

There is provided a polarizer excellent in heat resistance. A polarizer according to an embodiment of the present invention includes a resin film containing iodine, wherein an end portion of the resin film has formed therein a high-concentration portion having a concentration of a substance that forms a counter ion of iodine higher than that of another portion.

21 Claims, 7 Drawing Sheets

(51) Int. Cl.
*B32B 27/30* (2006.01)
*B32B 38/04* (2006.01)

(56) References Cited

U.S. PATENT DOCUMENTS

| | | | | |
|---|---|---|---|---|
| 2,204,604 A * | 6/1940 | Land | G03C 9/04 | 359/486.01 |
| 2,237,567 A * | 4/1941 | Land | G02B 5/3033 | 264/1.35 |
| 2,329,543 A * | 9/1943 | Land | G03C 9/04 | 359/486.02 |
| 2,409,923 A * | 10/1946 | Barnes | G03C 9/04 | 101/464 |
| 2,423,473 A * | 7/1947 | Barnes | G03C 9/04 | 430/370 |
| 2,440,102 A * | 4/1948 | Land | G03C 9/04 | 101/490 |
| 2,475,921 A * | 7/1949 | Smith | G02C 7/12 | 156/99 |
| 3,015,989 A * | 1/1962 | Delangre | G03C 9/04 | 264/1.34 |
| 3,520,752 A * | 7/1970 | Dreyer | B44C 1/1733 | 156/234 |
| 3,914,016 A * | 10/1975 | Dreyer | G02B 5/3016 | 349/165 |
| 4,166,871 A * | 9/1979 | Schuler | G02B 5/3033 | 359/487.02 |
| 4,181,756 A * | 1/1980 | Fergason | G02F 1/133528 | 349/187 |
| 4,220,705 A * | 9/1980 | Sugibuchi | G02B 5/3033 | 430/294 |
| 4,466,704 A * | 8/1984 | Schuler | G02B 5/3033 | 359/486.02 |
| 5,087,985 A * | 2/1992 | Kitaura | G02B 1/08 | 252/588 |
| 5,284,364 A * | 2/1994 | Jain | G06K 1/12 | 283/87 |
| 5,751,483 A * | 5/1998 | Itoh | G02B 5/3033 | 252/585 |
| 5,764,248 A * | 6/1998 | Scarpetti | C09D 11/328 | 347/2 |
| 5,793,733 A * | 8/1998 | Takeda | G11B 7/1353 | 369/112.02 |
| 5,844,717 A * | 12/1998 | Faris | G02B 27/0093 | 359/486.02 |
| 8,817,373 B2 | 8/2014 | Kobayashi et al. | | |
| 2001/0024322 A1 * | 9/2001 | Harita | C08J 5/18 | 359/487.02 |
| 2002/0063243 A1 * | 5/2002 | Matsumoto | G02B 5/3033 | 252/585 |
| 2003/0030906 A1 * | 2/2003 | Matsumoto | G02B 5/3033 | 359/487.01 |
| 2003/0151813 A1 * | 8/2003 | Nishida | G02B 5/3025 | 359/487.01 |
| 2003/0174399 A1 * | 9/2003 | Kusumoto | G02B 5/3033 | 359/487.01 |
| 2003/0227669 A1 * | 12/2003 | Volke | G02B 5/3033 | 359/352 |
| 2004/0212555 A1 * | 10/2004 | Falco | G06F 1/1626 | 345/50 |
| 2005/0200801 A1 * | 9/2005 | Watanabe | G02F 1/1335 | 349/194 |
| 2005/0264885 A1 * | 12/2005 | Albert | G02B 1/02 | 359/486.02 |
| 2005/0285998 A1 * | 12/2005 | Saita | G02B 5/3016 | 349/117 |
| 2006/0033993 A1 * | 2/2006 | Sugino | C08K 5/07 | 359/487.02 |
| 2006/0227423 A1 * | 10/2006 | Saiki | G02B 5/3033 | 359/487.02 |
| 2007/0146882 A1 * | 6/2007 | Yoshioka | G02B 5/3008 | 359/487.02 |
| 2007/0187023 A1 * | 8/2007 | Tsai | B29C 55/06 | 156/229 |
| 2007/0200967 A1 * | 8/2007 | Fu | B29C 55/06 | 349/43 |
| 2008/0192345 A1 * | 8/2008 | Mochizuki | B29C 55/026 | 359/485.01 |
| 2009/0180182 A1 * | 7/2009 | Kim | G03F 1/36 | 359/485.01 |
| 2009/0219465 A1 * | 9/2009 | Vesely | G02B 27/26 | 349/96 |
| 2009/0290215 A1 * | 11/2009 | Kwon | G02B 5/3033 | 359/489.2 |
| 2009/0303428 A1 * | 12/2009 | Tendler | G02C 7/12 | 351/49 |
| 2010/0039590 A1 * | 2/2010 | Miyatake | C09J 129/04 | 349/96 |
| 2011/0019274 A1 | 1/2011 | Kobayashi et al. | | |
| 2011/0148839 A1 * | 6/2011 | Hwang | G02B 5/205 | 345/211 |
| 2011/0163281 A1 * | 7/2011 | Bae | B29D 11/00644 | 252/585 |
| 2012/0052197 A1 * | 3/2012 | Sawada | C08J 5/18 | 427/163.1 |
| 2012/0057231 A1 * | 3/2012 | Goto | B29C 55/026 | 359/487.01 |
| 2012/0105400 A1 * | 5/2012 | Mathew | H04N 5/2251 | 345/207 |
| 2012/0106063 A1 * | 5/2012 | Mathew | G02F 1/133528 | 361/679.21 |
| 2012/0236408 A1 * | 9/2012 | Kwon | G02B 5/305 | 359/483.01 |
| 2013/0114137 A1 * | 5/2013 | Bae | G02B 5/3083 | 359/483.01 |
| 2013/0141787 A1 * | 6/2013 | Kim | G02B 5/3033 | 359/487.02 |
| 2013/0193832 A1 * | 8/2013 | Jung | G02B 5/3083 | 313/112 |
| 2013/0220525 A1 * | 8/2013 | Kunai | B29D 11/00644 | 156/229 |
| 2013/0258234 A1 * | 10/2013 | Park | G02F 1/133512 | 349/58 |
| 2014/0340831 A1 * | 11/2014 | Mathew | G02F 1/133514 | 361/679.27 |
| 2015/0070763 A1 * | 3/2015 | Goto | G02B 1/08 | 359/487.02 |
| 2015/0131035 A1 * | 5/2015 | Chen | G02B 5/305 | 349/96 |
| 2015/0132561 A1 * | 5/2015 | Goto | G02B 5/3033 | 428/220 |
| 2015/0192720 A1 * | 7/2015 | Goto | G02B 5/3033 | 428/220 |
| 2015/0253465 A1 * | 9/2015 | Trapani | G02C 7/12 | 156/277 |
| 2016/0195653 A1 * | 7/2016 | Lee | G02B 5/305 | 359/486.01 |
| 2016/0238770 A1 * | 8/2016 | Goto | G02B 5/3033 | |
| 2016/0282637 A1 * | 9/2016 | Ryan | G02C 7/12 | |
| 2016/0299272 A1 * | 10/2016 | Lee | B29D 11/00644 | |
| 2017/0045657 A1 * | 2/2017 | Ogomi | G02B 5/3025 | |
| 2017/0052299 A1 * | 2/2017 | Ogomi | G02B 5/3025 | |
| 2017/0090085 A1 * | 3/2017 | Goto | G02B 5/305 | |
| 2017/0129197 A1 * | 5/2017 | Yaegashi | B32B 7/02 | |
| 2017/0131448 A1 * | 5/2017 | Lee | B32B 27/30 | |
| 2017/0153485 A1 * | 6/2017 | Kim | G02B 6/0055 | |
| 2017/0254939 A1 * | 9/2017 | Lee | C08J 5/18 | |
| 2018/0011233 A1 * | 1/2018 | Takada | G02B 1/14 | |
| 2018/0017724 A1 * | 1/2018 | Nam | G02B 5/3066 | |

FOREIGN PATENT DOCUMENTS

| | | | | |
|---|---|---|---|---|
| JP | 48064941 A * | 6/1973 | | G02B 5/3033 |
| JP | 48038160 A * | 9/1973 | | G02F 1/133528 |
| JP | 58021705 A * | 2/1983 | | G02B 5/3033 |
| JP | 58168020 A * | 10/1983 | | G02B 5/3033 |
| JP | 59058419 A * | 4/1984 | | G02F 1/133528 |
| JP | 62096905 A * | 5/1987 | | |

(56) References Cited

FOREIGN PATENT DOCUMENTS

| | | | | |
|---|---|---|---|---|
| JP | 63189824 A | * | 8/1988 | |
| JP | 63265203 A | * | 11/1988 | |
| JP | 04215603 A | * | 8/1992 | |
| JP | 06167610 A | * | 6/1994 | |
| JP | 06245209 A | * | 9/1994 | |
| JP | 06347641 A | * | 12/1994 | |
| JP | 2001290025 A | * | 10/2001 | |
| JP | 2002040247 A | * | 2/2002 | |
| JP | 2002258051 A | * | 9/2002 | |
| JP | 2002357720 A | * | 12/2002 | |
| JP | 2003207627 A | * | 7/2003 | |
| JP | 2005181818 A | * | 7/2005 | |
| JP | 2009-37228 A | | 2/2009 | |
| JP | 2012078780 A | * | 4/2012 | |
| JP | 2013238640 A | * | 11/2013 | |
| JP | 2014081482 A | * | 5/2014 | |
| JP | 2014211548 A | * | 11/2014 | |
| KR | 20040019526 A | * | 3/2004 | ........... G02B 5/3025 |
| KR | 20100034825 A | * | 4/2010 | |
| KR | 20100087837 A | * | 8/2010 | ........... G02B 5/3033 |
| KR | 20100125560 A | * | 12/2010 | |
| KR | 20110110889 A | * | 10/2011 | ......... G02F 1/13471 |
| KR | 20120118205 A | * | 10/2012 | ........... G02B 5/3033 |
| WO | WO-2006095815 A1 | * | 9/2006 | ........... G02B 5/3033 |
| WO | WO-2007049513 A1 | * | 5/2007 | .............. B41M 5/50 |
| WO | WO-2009099049 A1 | * | 8/2009 | ........... G02B 5/3033 |
| WO | WO-2009154050 A1 | * | 12/2009 | ........... G02B 5/3025 |
| WO | WO-2011052901 A2 | * | 5/2011 | ......... G02F 1/13471 |
| WO | WO-2015046969 A1 | * | 4/2015 | ........... G02B 5/3033 |
| WO | WO-2015108261 A1 | * | 7/2015 | ........... G02B 5/3033 |
| WO | WO-2015145656 A1 | * | 10/2015 | ........... G02B 5/3033 |
| WO | WO-2015145658 A1 | * | 10/2015 | ........... G02B 5/3033 |
| WO | WO-2015147553 A1 | * | 10/2015 | ....... B29D 11/00644 |

* cited by examiner

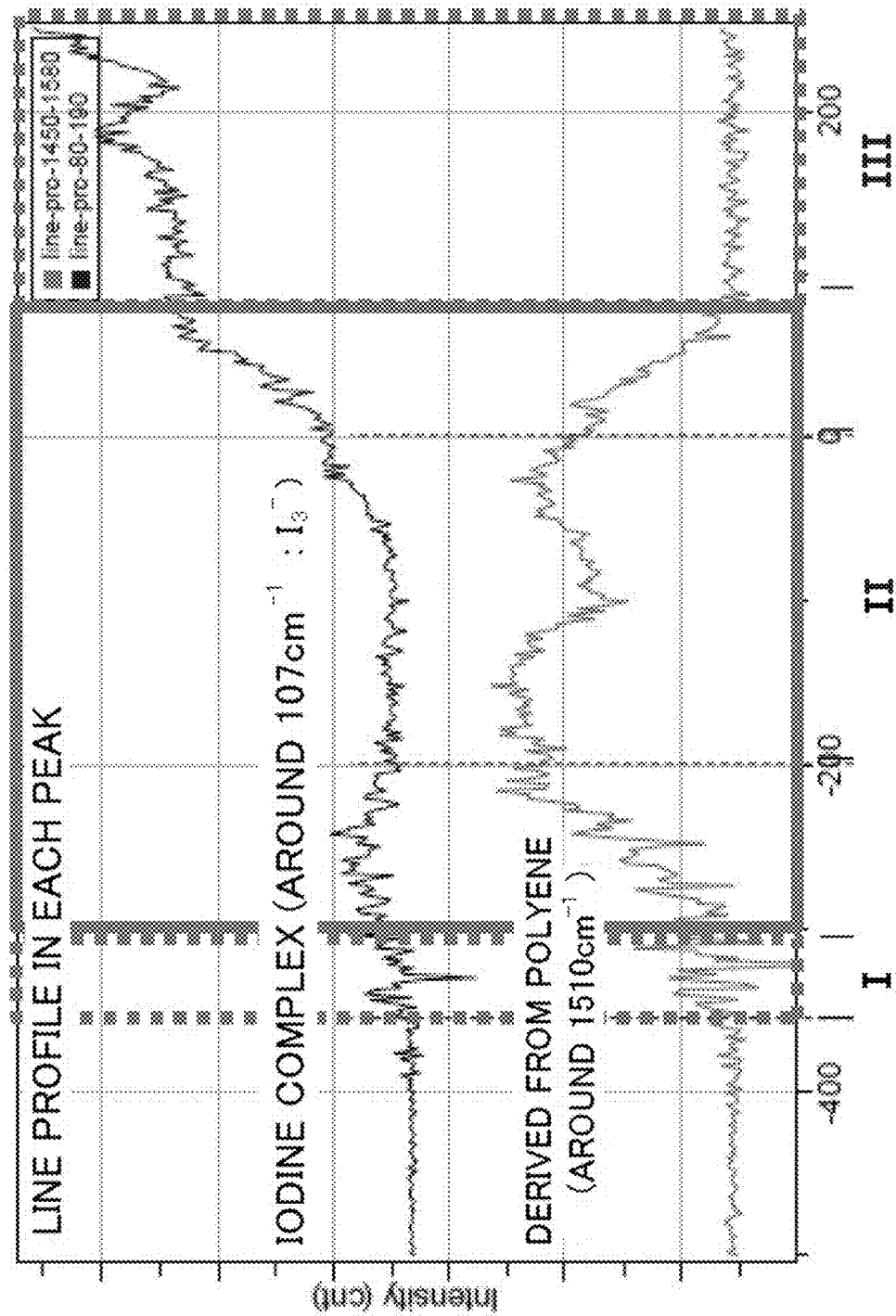

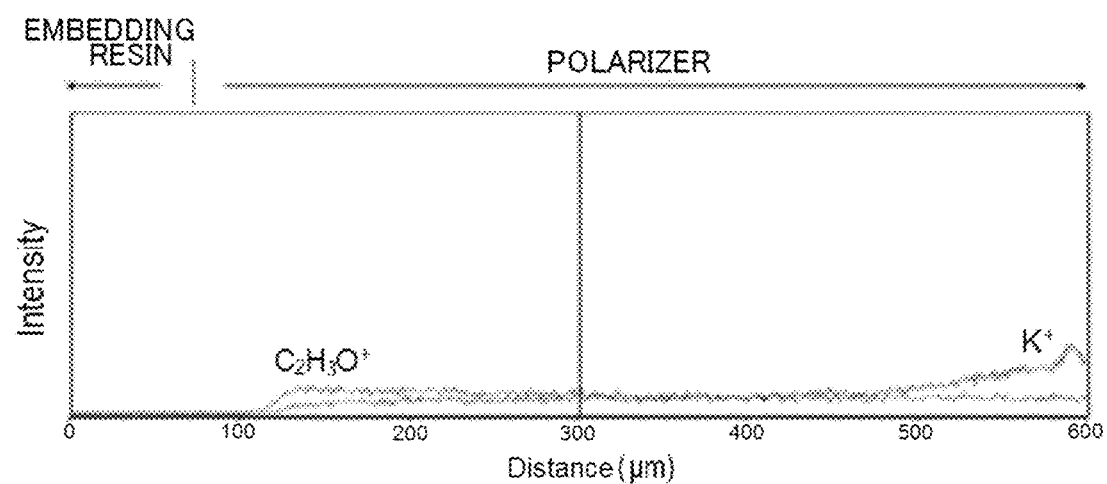

POLARIZER, POLARIZING PLATE, AND METHOD OF PRODUCING POLARIZER

BACKGROUND OF THE INVENTION

This application claims priority under 35 U.S.C. Section 119 to Japanese Patent Application No. 2015-216472 filed on Nov. 4, 2015 which is herein incorporated by reference.

1. Field of the Invention

The present invention relates to a polarizer, a polarizing plate, and a method of producing a polarizer.

2. Description of the Related Art

A polarizing plate has been used in an image display apparatus (e.g., a liquid crystal display apparatus) of a cellular phone, a notebook personal computer, or the like. In recent years, the use of the polarizing plate in, for example, a meter display portion of an automobile or a smart watch has been desired, and hence the formation of the polarizing plate into a shape other than a rectangular shape and the formation of a through-hole in the polarizing plate have been desired.

When the above-mentioned mode is adopted, a problem in terms of durability (e.g., a crack) is liable to occur. With a view to improving the durability, for example, there has been proposed a polarizing plate formed as described below (see Japanese Patent Application Laid-open No. 2009-37228). A pair of polarizer protective films are bonded to both principal surfaces of a polarizer, and the surface of an outer peripheral end surface is melted and then solidified. Meanwhile, an improvement in heat resistance of the polarizing plate (e.g., the suppression of its coloring) has also been required.

SUMMARY OF THE INVENTION

The present invention has been made to solve the problem, and a primary object of the present invention is to provide a polarizer excellent in heat resistance.

A polarizer according to an embodiment of the present invention includes a resin film containing iodine, wherein an end portion of the resin film has formed therein a high-concentration portion having a concentration of a substance that forms a counter ion of iodine higher than that of another portion.

In one embodiment of the present invention, the high-concentration portion has such a concentration gradient that the concentration of the substance that forms a counter ion of iodine increases outward in a plane direction.

In one embodiment of the present invention, the high-concentration portion is formed from an end surface of the resin film to a position distant therefrom by 100 µm or more inward in a plane direction.

In one embodiment of the present invention, the substance that forms a counter ion of iodine contains at least one of potassium or sodium.

In one embodiment of the present invention, the resin film contains boric acid, and the end portion of the resin film has formed therein a low-concentration portion having a concentration of the boric acid lower than that of another portion.

In one embodiment of the present invention, a region of the high-concentration portion includes a region of the low-concentration portion of the boric acid.

In one embodiment of the present invention, the high-concentration portion is formed in a region including an entirety of the region of the low-concentration portion of the boric acid.

In one embodiment of the present invention, the low-concentration portion has such a concentration gradient that a boric acid concentration reduces outward in a plane direction.

In one embodiment of the present invention, the low-concentration portion is formed from the end surface of the resin film to a position distant therefrom by 50 µm or more inward in a plane direction.

In one embodiment of the present invention, the low-concentration portion is formed in an end portion in an absorption axis direction.

In one embodiment of the present invention, the polarizer has formed therein a through-hole and the low-concentration portion is formed in a peripheral edge portion of the through-hole.

In one embodiment of the present invention, the low-concentration portion is formed in an outer edge portion.

In one embodiment of the present invention, the outer edge portion includes a site that forms a substantially V-shape that is convex inward in a plane direction.

According to another aspect of the present invention, there is provided a polarizing plate. The polarizing plate includes: the polarizer as described above; and a protective film arranged on at least one surface of the polarizer.

According to still another aspect of the present invention, there is provided a method of producing a polarizer. The method includes bringing a treatment liquid containing a substance that forms a counter ion of iodine into contact with a resin film containing iodine to form, in an end portion of the resin film, a high-concentration portion having a concentration of the substance that forms a counter ion of iodine higher than that of another portion.

In one embodiment of the present invention, the treatment liquid includes a solution obtained by dissolving, in a solvent, a compound containing the substance that forms a counter ion of iodine.

In one embodiment of the present invention, the compound contains at least one of potassium iodide or sodium chloride.

In one embodiment of the present invention, the treatment liquid has a liquid temperature of 50° C. or more.

In one embodiment of the present invention, the method further includes forming the resin film into a desired shape through at least one of cutting or punching processing.

In one embodiment of the present invention, the at least one of the cutting or the punching processing is performed by irradiating the resin film with laser light.

In one embodiment of the present invention, the laser light includes $CO_2$ laser light.

According to the present invention, the polarizer excellent in heat resistance can be provided.

BRIEF DESCRIPTION OF THE DRAWINGS

FIG. 4B is a graph for showing the results of the analysis thereof by microscopic Raman spectroscopy.

FIG. 5C is a graph for showing the concentration distribution of potassium of an end portion of the polarizer of Comparative Example 2 in its plane direction.

DETAILED DESCRIPTION OF THE PREFERRED EMBODIMENTS

Embodiments of the present invention are described below. However, the present invention is not limited to these embodiments.

A. Polarizer (Polarizing Plate)

Figure 1:
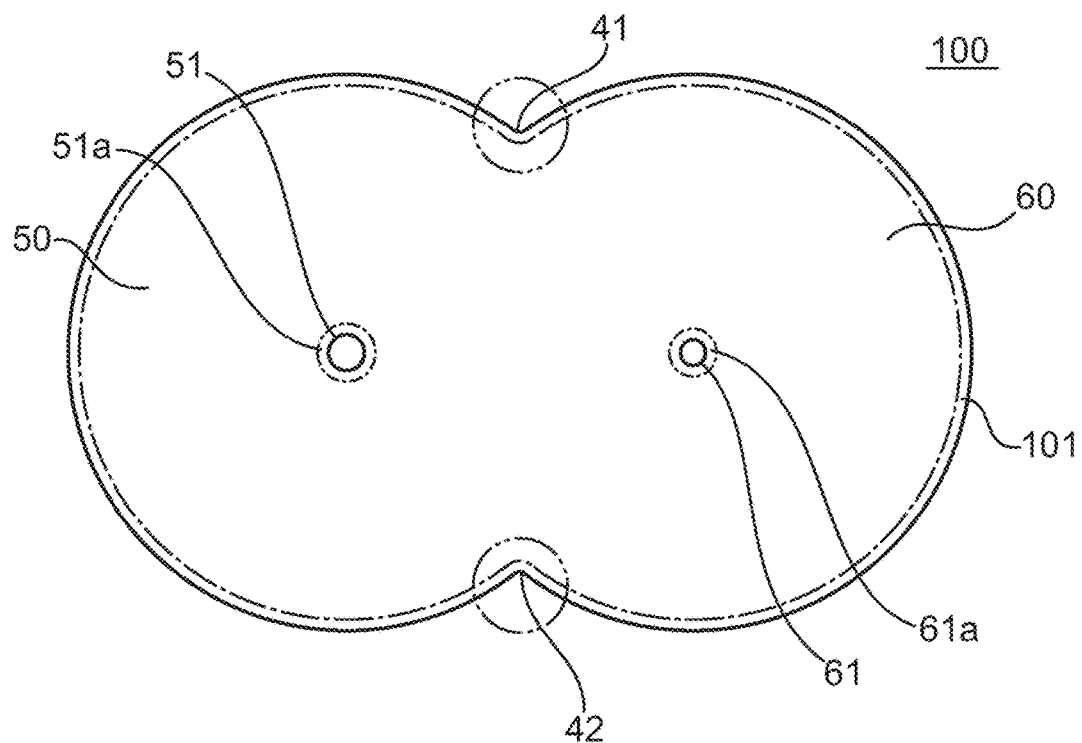
FIG. 1 is a plan view of a polarizing plate according to one embodiment of the present invention.
Figure 2:
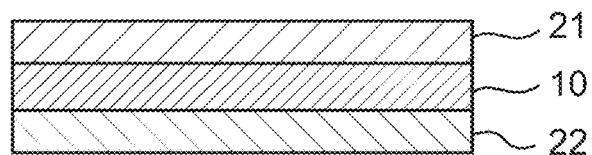
FIG. 2 is a partially enlarged sectional view of the polarizing plate illustrated in FIG. 1.

FIG. 1 is a plan view of a polarizing plate according to one embodiment of the present invention, and FIG. 2 is a partially enlarged sectional view of the polarizing plate illustrated in FIG. 1. A polarizing plate 100 is suitably used in the meter panel of an automobile. The polarizing plate 100 includes a first display portion 50 and a second display portion 60 that are continuously arranged, and through-holes 51 and 61 for fixing various meter needles are formed around the centers of the respective display portions. The diameter of each of the through-holes is, for example, from 0.5 mm to 100 mm. The outer edge of each of the display portions 50 and 60 is formed into an arc shape along the rotational direction of a meter needle.

A polarizer is typically used in a state in which a protective film is laminated thereon (i.e., in the state of a polarizing plate). The polarizing plate 100 of the illustrated example includes a polarizer 10, and a pair of protective films 21 and 22 arranged on both principal surfaces of the polarizer 10. Although the protective films are arranged on both principal surfaces of the polarizer in the illustrated example, a protective film may be arranged only on one surface thereof.

The polarizer includes a resin film. Any appropriate resin may be used as a resin forming the resin film. A polyvinyl alcohol-based resin (hereinafter referred to as "PVA-based resin") is preferably used. Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably 95.0 mol % or more, more preferably 99.0 mol % or more, particularly preferably 99.93 mol % or more. The saponification degree may be determined in conformity with JIS K 6726-1994. The use of the PVA-based resin having such saponification degree can provide a polarizer excellent in durability.

The average polymerization degree of the PVA-based resin may appropriately be selected depending on purposes. The average polymerization degree is typically from 1,000 to 10,000, preferably from 1,200 to 6,000, more preferably from 2,000 to 5,000. The average polymerization degree may be determined in conformity with JIS K 6726-1994.

The polarizer (resin film) typically contains a dichromatic substance. Examples of the dichromatic substance include iodine and an organic dye. The substances may be used alone or in combination. Of those, iodine is preferably used.

The polarizer (resin film) 10 contains a substance that forms a counter ion of iodine, and an end portion thereof (specifically, each of an outer edge portion 101, and peripheral edge portions 51a and 61a of the through-holes 51 and 61) has formed therein a high-concentration portion having a concentration of the substance higher than that of any other portion. Examples of the substance that forms a counter ion of iodine include metals that can form halides, such as potassium, sodium, lithium, zinc, aluminum, lead, copper, barium, calcium, tin, and titanium. Of those, potassium or sodium is preferably used. In the resin film, the substance that forms a counter ion of iodine may adopt any appropriate state. Specifically, the substance may be in the state of an ion or may be a substance bonded to any other substance, or these states may be mixed. Examples of the other substance include an iodine ion (I$^-$) and an iodine complex (I$_3^-$).

The high-concentration portion has, for example, such a concentration gradient that the concentration of the substance that forms a counter ion of iodine increases outward in a plane direction. The content of the substance that forms a counter ion of iodine in the other portion is, for example, from 0.3 wt % to 5 wt %. In one embodiment, the substance that forms a counter ion of iodine present in the other portion is mainly a substance introduced into the resin film in various treatments, such as a dyeing treatment, a cross-linking treatment, and a washing treatment to be described later.

The high-concentration portion is preferably formed from an end surface of the polarizer (resin film) to a position distant therefrom by 100 μm or more inward in the plane direction, and is more preferably formed from the end surface of the polarizer to a position distant therefrom by 500 μm or more. Meanwhile, the high-concentration portion is preferably formed from the end surface of the polarizer to a position distant therefrom by 2,000 μm or less inward in the plane direction, and is more preferably formed from the end surface of the polarizer to a position distant therefrom by 1,000 μm or less.

The polarizer (resin film) 10 typically contains boric acid. In one embodiment, the end portion of the polarizer (resin film) 10 (specifically, each of the outer edge portion 101, and the peripheral edge portions 51a and 61a of the through-holes 51 and 61) has formed therein a low-concentration portion having a concentration of boric acid lower than that of any other portion. The formation of the low-concentration portion can improve the durability of the polarizer. Specifically, the formation can suppress the occurrence of a crack. The polarizer typically has a shrinkage force larger than that of a protective film, and hence a stress may occur at an interface between the polarizer and the protective film owing to a change in temperature or humidity to cause the crack. The rigidity of the low-concentration portion can be made lower than that of the other portion by, for example, the removal of a cross-linked structure based on boric acid. As a result, in the low-concentration portion, a stress due to the shrinkage of the polarizer is relaxed and hence the occurrence of the crack can be suppressed. Therefore, the occurrence of the crack can be effectively suppressed by forming the low-concentration portion in a site on which a stress is liable to concentrate, such as the peripheral edge of a through-hole or a site that forms a V-shape to be described later. In addition, according to such mode, influences on the external appearance of the polarizer and its bonding to any other member are extremely small.

In the embodiment, the low-concentration portion has, for example, such a concentration gradient that a boric acid concentration reduces outward in the plane direction. The presence of the concentration gradient can suppress an abrupt reduction in polarizing performance in the end portion while suppressing the occurrence of the crack. A boric acid content in the other portion is, for example, from 20 wt % to 30 wt %.

The low-concentration portion of boric acid is preferably formed from the end surface of the polarizer (resin film) to a position distant therefrom by 50 µm or more inward in the plane direction, and is more preferably formed from the end surface of the polarizer to a position distant therefrom by 80 µm or more. When the portion is formed in such range, an improving effect on the durability can be sufficiently obtained. Meanwhile, the low-concentration portion of boric acid is preferably formed from the end surface of the polarizer to a position distant therefrom by 1,000 µm or less inward in the plane direction, and is more preferably formed from the end surface of the polarizer to a position distant therefrom by 500 µm or less.

When a through-hole is formed like the illustrated example, the position of the through-hole may be appropriately set in accordance with, for example, the applications of the polarizer. The crack is liable to occur from the peripheral edge of the through-hole serving as a starting point, and the tendency may be more remarkable as the position of the through-hole becomes more distant from the outer edge of the polarizer. As a result, as the position of the through-hole becomes more distant from the outer edge of the polarizer (e.g., its distance from the outer edge of the polarizer is 15 mm or more), the durability-improving effect exhibited by the formation of the low-concentration portion of boric acid can be more significantly obtained.

In the outer edge portion 101, the low-concentration portion of boric acid is preferably formed in at least a boundary portion 41 or 42 between the respective display portions. Specifically, the low-concentration portion of boric acid is preferably formed in a site whose outer edge forms a V-shape (including an R-shape) that is convex inward in the plane direction. This is because the site whose outer edge forms a V-shape that is convex inward in the plane direction is liable to serve as the starting point of the crack as in the peripheral edge of the through-hole.

The low-concentration portion of boric acid is preferably formed in an end portion in the absorption axis direction of the polarizer. The crack tends to occur along the absorption axis direction of the polarizer, and hence the formation of the low-concentration portion in the end portion in the absorption axis direction can effectively suppress the occurrence of the crack.

The formation of the high-concentration portion can improve the heat resistance of the resin film. The region of the high-concentration portion preferably includes the region of the low-concentration portion of boric acid. Specifically, the region of the high-concentration portion is formed so as to correspond to the region of the low-concentration portion of boric acid. The high-concentration portion is more preferably formed in a region including the entirety of the region of the low-concentration portion of boric acid. In one embodiment, when the low-concentration portion of boric acid is formed from the end surface of the resin film to a predetermined position inward in the plane direction, the high-concentration portion is preferably formed so as to extend from the low-concentration portion of boric acid inward in the plane direction by 100 µm or more. According to such mode, the heat resistance can be improved with reliability. As described above, the rigidity of the low-concentration portion of boric acid may be made lower than that of the other portion by the removal of the cross-linked structure based on boric acid. Accordingly, while the occurrence of the crack is suppressed, the heat resistance may reduce. One possible cause for the foregoing is that in the low-concentration portion of boric acid, the content of an iodine complex (e.g., $I_3^-$ or $I_5^-$) is low and the content of an iodine ion (e.g., $I^-$ or $I_3^-$) is high. While the iodine complex may be aligned in the resin film, the iodine ion may be present in an instable state in the resin film. Accordingly, when the high-concentration portion is formed to introduce a counter ion, the iodine ion can be stabilized to contribute to an improvement in heat resistance of the resin film (e.g., the suppression of the coloring of the resin film by the suppression of polyene formation). In the low-concentration portion of boric acid, the content of iodine ($I_2$) is also considered to be high and hence iodine may also be present in an instable state in the resin film.

The polarizer preferably shows absorption dichroism in the wavelength range of from 380 nm to 780 nm. The single axis transmittance (Ts) of the polarizer is preferably 40% or more, more preferably 41% or more, still more preferably 42% or more, particularly preferably 43% or more. A theoretical upper limit for the single axis transmittance is 50%, and a practical upper limit therefor is 46%. In addition, the single axis transmittance (Ts) is a Y value measured with the two-degree field of view (C light source) of JIS Z 8701 and subjected to visibility correction, and may be measured with, for example, a spectrophotometer (manufactured by JASCO Corporation, V7100). The polarization degree of the polarizer is preferably 99.8% or more, more preferably 99.9% or more, still more preferably 99.95% or more.

The thickness of the polarizer may be set to any appropriate value. The thickness is typically from 1 µm to 80 µm, preferably from 3 µm to 40 µm.

As the formation materials of the protective film, there are given, for example, a cellulose-based resin, such as diacetyl cellulose or triacetyl cellulose (TAC), a (meth)acrylic resin, a cycloolefin-based resin, an olefin-based resin, such as polypropylene, an ester-based resin, such as a polyethylene terephthalate-based resin, a polyamide-based resin, a polycarbonate-based resin, and copolymer resins thereof. The term "(meth)acrylic resin" refers to an acrylic resin and/or a methacrylic resin.

The thickness of the protective film is preferably from 10 µm to 200 µm. A surface-treated layer may be formed on one side of the protective film (side on which the polarizer is not arranged). Specifically, the side may be subjected to a hard coat treatment, an antireflection treatment, or a treatment intended for diffusion or anti-glaring. The constructions (including a formation material and a thickness) of the pair of protective films may be identical to each other, or may be different from each other.

The protective film is typically laminated on the surface of the polarizer through intermediation of an adhesive layer. Any appropriate adhesive may be used as an adhesive. For example, an aqueous adhesive, a solvent-based adhesive, or an active energy ray-curable adhesive is used. An adhesive containing a PVA-based resin is preferably used as the aqueous adhesive.

The polarizer (polarizing plate) of the present invention is not limited to the construction of the illustrated example and may be appropriately changed. For example, the shape of the polarizer (polarizing plate), the presence or absence of the through-holes, the shapes and sizes of the through-holes, and the number and formation positions of the through-holes may be appropriately changed.

B. Method of Producing Polarizer (Polarizing Plate)

The polarizer is preferably produced by bringing a treatment liquid containing the substance that forms a counter ion of iodine into contact with the resin film containing iodine. According to such mode, the substance that forms a counter ion of iodine can be introduced into a desired site of the resin film to simply form the high-concentration portion. In addition, in such mode, boric acid in the resin film can be eluted in the treatment liquid to simultaneously form the low-concentration portion of boric acid.

Any appropriate method may be adopted as a method of bringing the treatment liquid into contact with the resin film. Specific examples thereof include: a method involving immersing the resin film in the treatment liquid; a method involving applying the treatment liquid to the resin film; and a method involving spraying the resin film with the treatment liquid. Of those, a method involving immersing the resin film in the treatment liquid is preferably adopted.

The treatment liquid containing the substance that forms a counter ion of iodine is typically a solution obtained by dissolving, in a solvent, a compound containing the substance that forms a counter ion of iodine. Examples of the compound containing the substance that forms a counter ion of iodine include halides (preferably iodides and chlorides) of potassium, sodium, lithium, zinc, aluminum, lead, copper, barium, calcium, tin, and titanium. Of those, potassium iodide and sodium chloride are preferably used.

Examples of the solvent include water, alcohols, such as methanol and ethanol; dimethyl sulfoxide, dimethylformamide, dimethylacetamide, N-methylpyrrolidone, various glycols, polyhydric alcohols, such as trimethylolpropane, and amines, such as ethylenediamine and diethylenetriamine. They may be used alone or in combination. Of those, water is preferably used.

The compounding amount of the compound is preferably from 0.1 part by weight to 10 parts by weight, more preferably from 1 part by weight to 5 parts by weight with respect to 100 parts by weight of the solvent.

The treatment liquid may contain an additive.

The liquid temperature of the treatment liquid (at the time of the contact) is preferably 50° C. or more, more preferably 60° C. or more. Meanwhile, the liquid temperature of the treatment liquid (at the time of the contact) is preferably 90° C. or less. In a preferred embodiment, in a state in which the treatment liquid is brought into contact with the resin film, the treatment liquid is warmed so that the treatment liquid may have a predetermined temperature (the temperature of the treatment liquid may be maintained at the predetermined temperature). When the resin film is immersed in the treatment liquid, an immersion time is, for example, from 3 minutes to 20 minutes.

When the treatment liquid is brought into contact with the resin film, the treatment liquid may be subjected to an ultrasonic treatment. Specifically, the resin film is immersed in an ultrasonic bath. According to such mode, the low-concentration portion can be efficiently formed. The ultrasonic treatment may be performed under any appropriate conditions. An output is, for example, from 40 W to 1,000 W. A frequency is, for example, from 15 kHz to 100 kHz.

When the treatment liquid is brought into contact with the resin film, the resin film is preferably subjected to various treatments, such as a swelling treatment, a stretching treatment, a dyeing treatment with the dichromatic substance, a cross-linking treatment, a washing treatment, and a drying treatment, to be brought into a state in which the film can be used as a polarizer. The resin film containing boric acid is obtained by, for example, bringing a boric acid solution (e.g., an aqueous solution of boric acid) into contact with the resin film at the time of the stretching treatment or the cross-linking treatment. When the various treatments are performed, the resin film may be a resin layer formed on a substrate. A stretching direction in the stretching treatment may correspond to the absorption axis direction of the polarizer to be obtained. In ordinary cases, the resin film is uniaxially stretched at from 3 times to 7 times from the viewpoint that excellent polarization characteristics are obtained.

Figure 3:
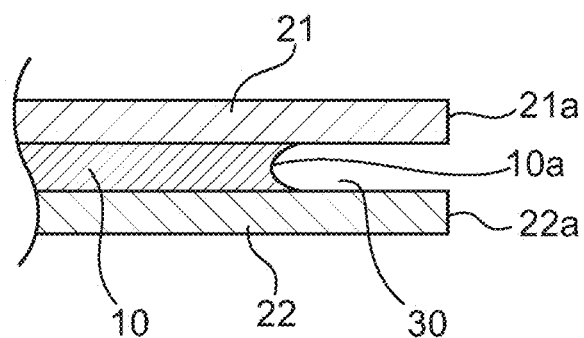
FIG. 3 is an enlarged sectional view of an end portion of the polarizing plate according to the one embodiment of the present invention.

It is preferred that the resin film be covered with a cover film and the treatment liquid be selectively brought into contact with a desired site. A film that can be utilized as it is as the protective film after the contact of the treatment liquid is preferably used as the cover film. In one embodiment, a laminate obtained by laminating the protective film on each of both principal surfaces of the resin film (polarizer) is immersed in the treatment liquid. According to such mode, the high-concentration portion having the concentration gradient and/or the low-concentration portion having the concentration gradient can be formed. In addition, according to such mode, as illustrated in FIG. 3, an end surface 10a of the polarizer 10 can be positioned more inward in the plane direction than end surfaces 21a and 22a of the protective films 21 and 22 are, and hence a polarizer void portion 30 can be formed. The formation of the polarizer void portion can further improve the durability.

As illustrated in the figure, forming into a desired shape is typically performed by cutting and/or punching processing. It is preferred that the cutting and/or the punching processing be performed before the formation of the high-concentration portion. In addition, it is preferred that the cutting and/or the punching processing, which may be performed on the polarizer (resin film) alone, be performed on a laminate of the polarizer and the protective film. In a preferred embodiment, the high-concentration portion is formed after the laminate of the polarizer and the protective film has been formed into the desired shape by the cutting and/or the punching processing.

Any appropriate method may be adopted as a cutting (punching) method. For example, a method involving using a cutting blade (punching die), such as a Thomson blade or a pinnacle blade, or a method involving irradiating the laminate with laser light is given. Of those, cutting by the laser light irradiation is preferably adopted. The laser light irradiation provides a smooth cut surface and hence can suppress the occurrence of the starting point of a crack (initial crack).

Any appropriate laser may be adopted as the laser. A laser that can emit light having a wavelength in the range of from 150 nm to 11 μm is preferably used. Specific examples thereof include a gas laser, such as a $CO_2$ laser, a solid laser, such as an YAG laser, and a semiconductor laser. Of those, a $CO_2$ laser is preferably used.

A condition for the laser light irradiation may be set to any appropriate condition depending on, for example, the laser to be used. When the $CO_2$ laser is used, an output condition is preferably from 10 W to 1,000 W, more preferably from 100 W to 400 W.

The resin film (laminate) may be subjected to the drying treatment after its contact with the treatment liquid. A drying temperature is, for example, from 50° C. to 120° C.

Now, the present invention is specifically described by way of Examples. However, the present invention is not limited to these Examples.

EXAMPLE 1

(Production of Polarizer)

A polymer film containing a PVA-based resin as a main component was sequentially immersed in the below-indicated five baths [1] to [5] while a tension was applied in the lengthwise direction of the film, followed by stretching. The stretched film was dried to provide a polarizer having a thickness of 28 μm.

<Conditions>
[1] Swelling bath: Pure water at 30° C.
[2] Dyeing bath: An aqueous solution at 30° C. containing iodine and potassium iodide
[3] First cross-linking bath: An aqueous solution at 40° C. containing potassium iodide and boric acid
[4] Second cross-linking bath: An aqueous solution at 60° C. containing potassium iodide and boric acid
[5] Washing bath: An aqueous solution at 25° C. containing potassium iodide (Production of Polarizing Plate Sheet)

A PVA-based adhesive was applied to one side of the polarizer so that its thickness after drying became 100 nm, and an elongated TAC film having a thickness of 40 μm was bonded to the polarizer so that their lengthwise directions were aligned with each other.

Subsequently, a PVA-based adhesive was applied to the other side of the polarizer so that its thickness after drying became 100 nm, and an elongated acrylic film having a thickness of 30 μm was bonded to the polarizer so that their lengthwise directions were aligned with each other.

Thus, a polarizing plate sheet having a construction "TAC film/polarizer/acrylic film" was obtained.

The resultant polarizing plate sheet was cut with a $CO_2$ laser (wavelength: 9.35 μm, output: 150 W) to provide a cut piece of a size measuring 54 mm by 54 mm, the cut piece having a through-hole having a diameter of 4 mm formed in a site distant from its outer edge by 25 mm.

The resultant cut piece was immersed in a 3 wt % aqueous solution of potassium iodide kept at 74° C. for 16 minutes to provide a polarizing plate.

COMPARATIVE EXAMPLE 1

A polarizing plate was obtained in the same manner as in Example 1 except that the cut piece was not immersed in the aqueous solution of potassium iodide.

COMPARATIVE EXAMPLE 2

A polarizing plate was obtained in the same manner as in Example 1 except that the cut piece was immersed in warm water at 74° C. instead of the aqueous solution of potassium iodide.

The resultant polarizing plates were each subjected to the following tests.

1. Heat Cycle Test

A test sample was obtained by bonding each of the resultant polarizing plates to a glassplate with an acrylic pressure-sensitive adhesive (thickness: 20 μm). The sample was left to stand under an environment at −40° C. for 30 minutes and then left to stand under an environment at 85° C. for 30 minutes. The foregoing operation was defined as one cycle and the cycle was repeated 100 times. After that, whether or not a crack occurred in the polarizing plate was observed.

2. Heat Resistance Test

A test sample was obtained by bonding each of the resultant polarizing plates to a glass plate with an acrylic pressure-sensitive adhesive (thickness: 20 μm). The sample was left to stand under an environment at 105° C. for 140 hours, and whether or not the polarizing plate colored after the heat resistance test was observed.

In each of the polarizing plates of Example 1 and Comparative Example 2, the occurrence of a crack (including a small crack) was not observed after the heat cycle test (also referred to as heat shock (HS) test). Meanwhile, in the polarizing plate of Comparative Example 1, a crack occurred along a stretching direction from a through-hole serving as a starting point after the HS test.

Figure 4A:
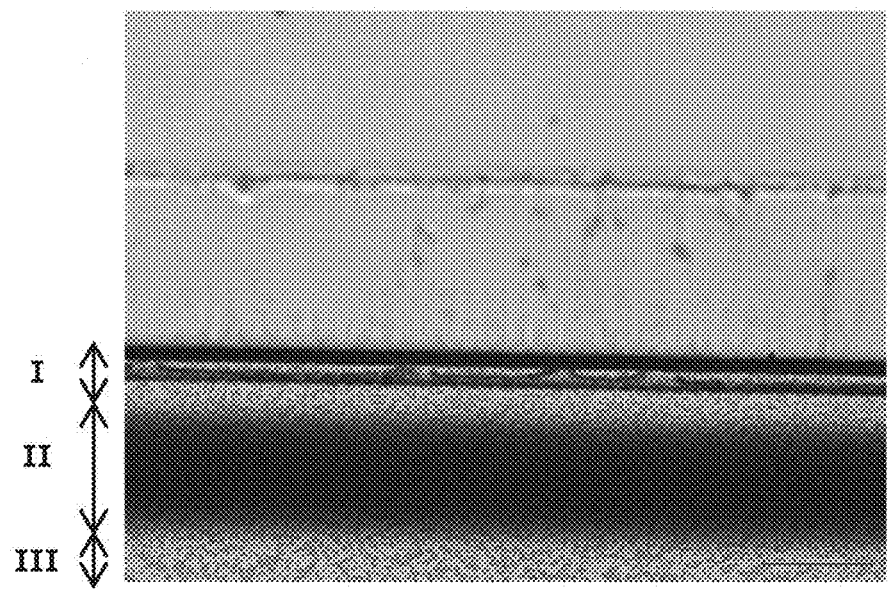
FIG. 4A is a photograph obtained by observing an end portion of the polarizing plate of Comparative Example 2 after a heat resistance test with an optical microscope.

In each of Example 1 and Comparative Example 1, no coloring was observed after the heat resistance test. In contrast, in Comparative Example 2, as shown in a photograph of FIG. 4A obtained by observation with an optical microscope (manufactured by Olympus Corporation, MX61, magnification: 5), a colored portion having a width of about 300 μm was observed along an end side of the polarizing plate. The results of the analysis of an end portion of the polarizing plate of Comparative Example 2 after the heat resistance test by microscopic Raman spectroscopy are shown in FIG. 4B. The coloring is assumed to be due to polyene formation. The content of an iodine complex ($I_3^-$) in the colored portion is much lower than that in a non-colored portion. Measurement conditions for the microscopic Raman spectroscopy are as described below.

Apparatus: laser Raman microscope (Jobin Yvon S.A.S., LabRAM HR800)
Excitation wavelength: 514 nm
Measurement range of wavelength: near 80 $cm^{-1}$ to 1,800 $cm^{-1}$
Grating: 600 gr/mm
Objective lens: ×100
Accumulation time: 2 sec
Accumulation number: 2
Filter: D3
Hole: 300
Detector: CCD The resultant polarizing plates were each subjected to the following evaluations.

1. Concentration Distribution Measurement

The concentration distributions of iodine, potassium, and boric acid of an end portion of a polarizer in its plane direction were measured. A time-of-flight secondary ion mass spectrometer (TOF-SIMS) (manufactured by ION-TOF, product name: TOF-SIMS 5) was used in the measurement. A sample obtained by embedding each of the resultant polarizing plates in a resin and preparing a section with a microtome was used as a measurement sample. Measurement conditions are as described below.

Primary ion for irradiation: $Bi_3^{2+}$
Primary ion acceleration voltage: 25 kV
Measurement area: 300-micrometer square×two fields of view
An electron gun for charge correction was used in the measurement.

2. Observation with Optical Microscope

Each of the polarizing plates whose end portions each had been embedded in a resin was cut in its thickness direction, and a cut surface was observed with an optical microscope (manufactured by Nikon Corporation, ECLIPSE LV100, magnification: 50).

Figure 5A:
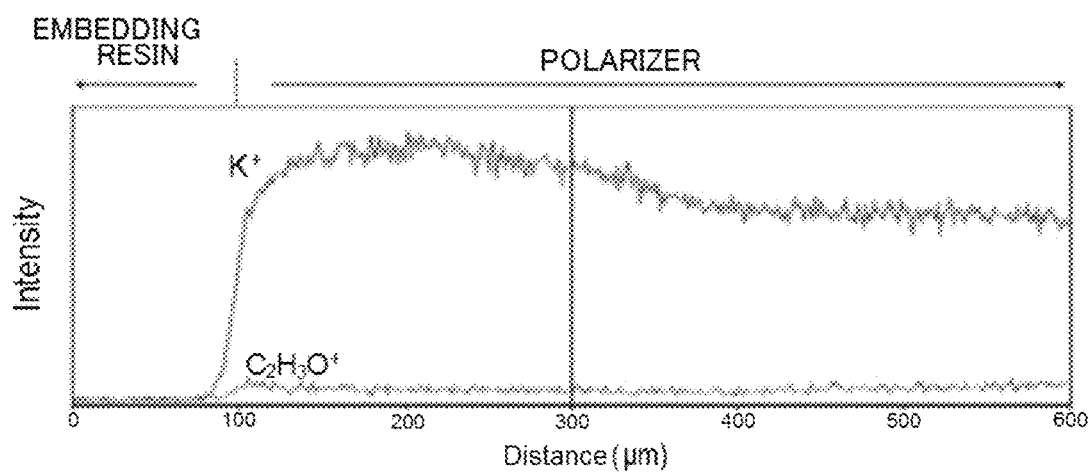
FIG. 5A is a graph for showing the concentration distribution of potassium of an end portion of the polarizer of Example 1 in its plane direction.
Figure 5B:
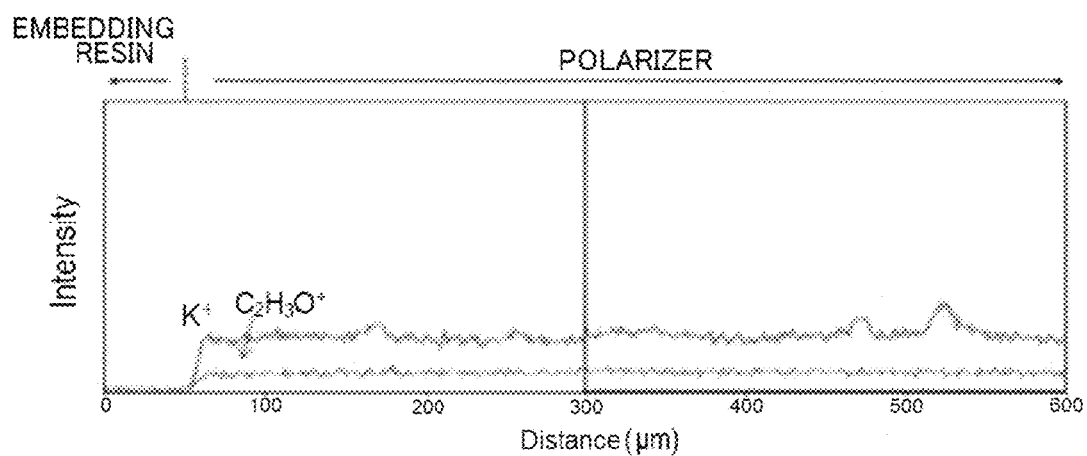
FIG. 5B is a graph for showing the concentration distribution of potassium of an end portion of the polarizer of Comparative Example 1 in its plane direction.
Figure 6:
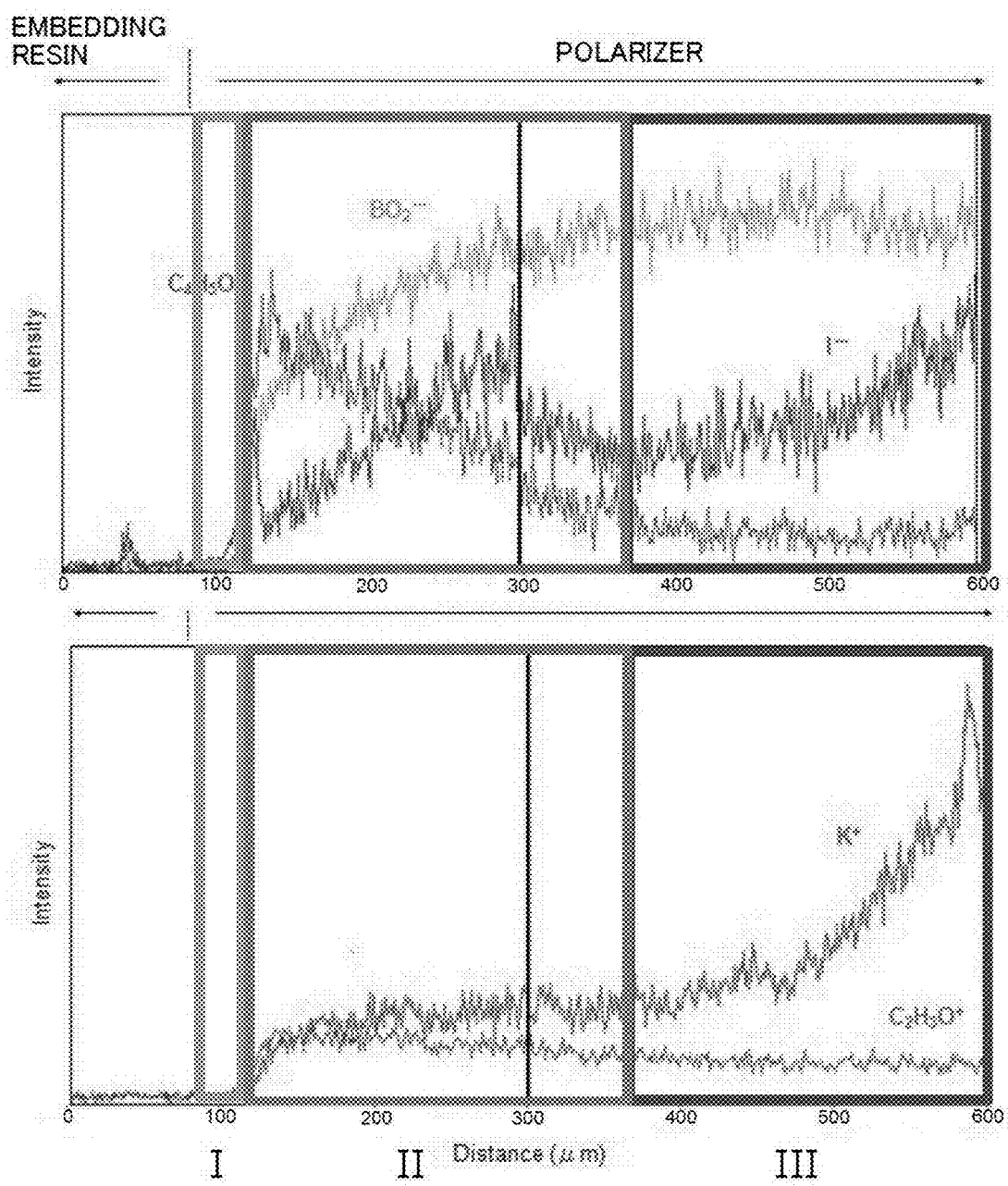
FIG. 6 is a graph for showing the concentration distributions of the end portion of the polarizer of Comparative Example 2 in the plane direction.

FIG. 5A is a graph for showing the concentration distribution of potassium of an end portion of the polarizer of Example 1 in its plane direction, FIG. 5B is a graph for showing the concentration distribution of potassium of an end portion of the polarizer of Comparative Example 1 in its plane direction, and FIG. 5C is a graph for showing the concentration distribution of potassium of an end portion of the polarizer of Comparative Example 2 in its plane direction. It was confirmed that the end portion of the polarizer of Example 1 had formed therein a high-concentration portion having such a concentration gradient that a potassium concentration increased outward. The potassium concentration of the high-concentration portion was up to about 10 times as high as the potassium concentration of the central portion of the polarizer. As shown in FIG. 6, it was confirmed that the end portion of the polarizer of Comparative Example 2 had formed therein a low-concentration portion having such a concentration gradient that a boric acid concentration reduced outward. It was confirmed that the end portion of the polarizer of Example 1 also had formed therein a low-concentration portion of boric acid. In FIG. 6, an intensity is shown in an enlarged manner. In addition, regions I, II, and III of FIG. 6 correspond to regions I, II, and III of each of FIG. 4A and FIG. 4B.

Figure 7A:
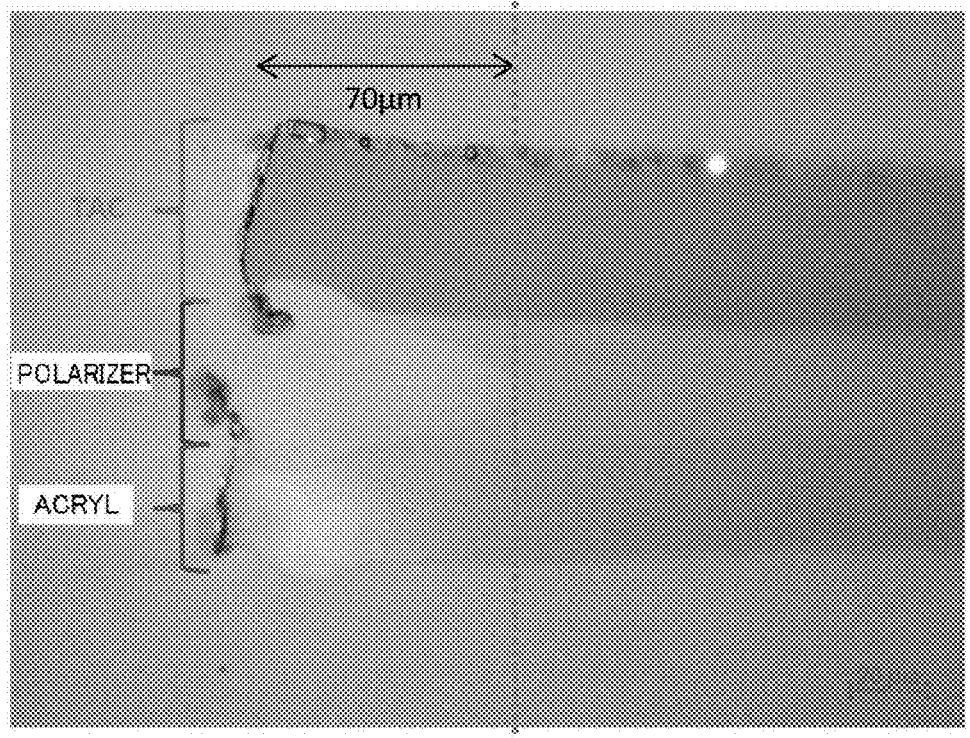
FIG. 7A is a photograph obtained by observing an end portion of the polarizing plate of Example 1 with an optical microscope.
Figure 7B:
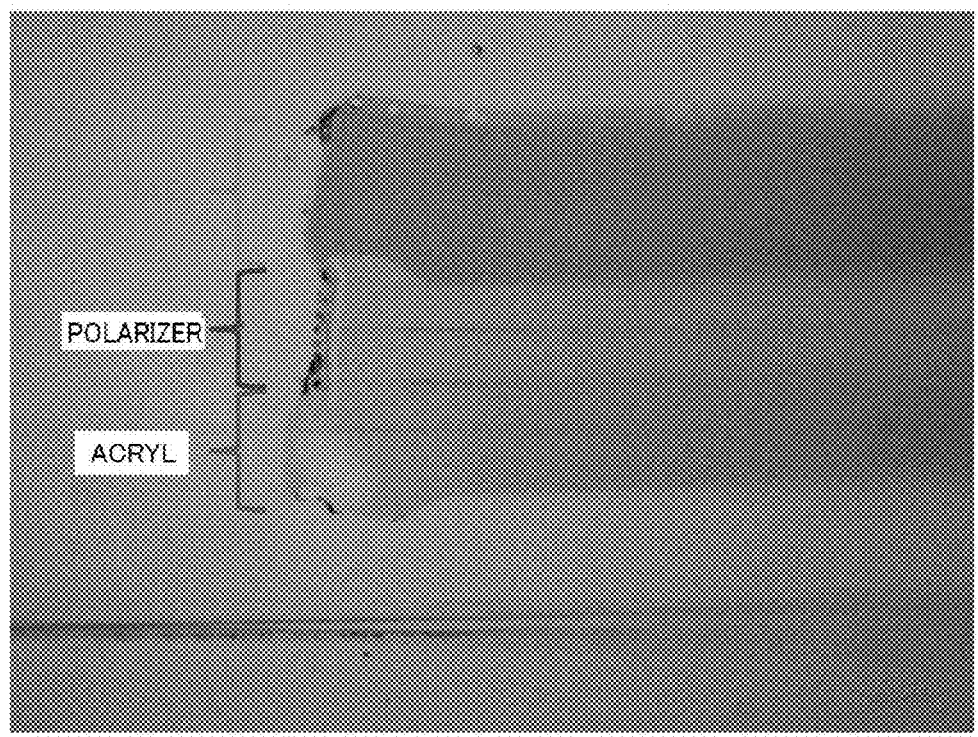
FIG. 7B is a photograph obtained by observing an end portion of the polarizing plate of Comparative Example 1 with an optical microscope.

FIG. 7A and FIG. 7B are each a photograph obtained by observation with an optical microscope. FIG. 7A is a photograph for showing an end portion of the polarizing plate of Example 1, and FIG. 7B is a photograph for showing an end portion of the polarizing plate of Comparative Example 1. It was confirmed that the end portion of the polarizing plate of Example 1 had formed therein a polarizer void portion. The same result as that of Example 1 was obtained for Comparative Example 2.

The polarizer of the present invention can be suitably used not only in an image display apparatus (a liquid crystal display apparatus or an organic EL device) of a rectangular shape but also in, for example, an image display portion of a particular shape typified by the meter display portion of an automobile or a smart watch.

Many other modifications will be apparent to and be readily practiced by those skilled in the art without departing from the scope and spirit of the invention. It should therefore be understood that the scope of the appended claims is not intended to be limited by the details of the description but should rather be broadly construed.

The invention claimed is:

1. A polarizer, comprising a resin film containing iodine, wherein at least one end portion of the resin film has formed therein a high-concentration portion having a concentration of a substance that forms a counter ion of iodine higher than that of another portion, wherein the at least one end portion comprises an outer peripheral edge of the polarizer including a site forming a substantially V-shape that is convexly curved in a plane direction and/or an internal peripheral edge of a through hole, and wherein the polarizer has a polarization degree of 99.8% or more.

2. The polarizer according to claim 1, wherein the concentration of the substance that forms a counter ion of iodide in the other portion is from 0.3 wt % to 5 wt %.

3. The polarizer according to claim 1, wherein the high-concentration portion has a concentration gradient that the concentration of the substance that forms the counter ion of iodine increases toward the outer edge and/or toward the internal edge in a plane direction.

4. The polarizer according to claim 1, wherein the high-concentration portion is formed from the outer edge and/or internal edge to a position distant therefrom by 100 μm or more in a plane direction.

5. The polarizer according to claim 1, wherein the substance that forms a counter ion of iodine contains at least one of potassium or sodium.

6. The polarizer according to claim 1, wherein the resin film contains boric acid, and the at least one end portion of the resin film has formed therein a low-concentration portion having a concentration of the boric acid lower than that of another portion.

7. The polarizer according to claim 6, wherein a region of the high-concentration portion includes a region of the low-concentration portion of the boric acid.

8. The polarizer according to claim 7, wherein the high-concentration portion is formed in a region including an entirety of the region of the low-concentration portion of the boric acid.

9. The polarizer according to claim 6, wherein the low-concentration portion has a concentration gradient that a boric acid concentration reduces toward the outer edge and/or toward the internal edge in a plane direction.

10. The polarizer according to claim 6, wherein the low-concentration portion is formed from the outer edge and/or internal edge to a position distant therefrom by 50 μm or more in a plane direction.

11. The polarizer according to claim 6, wherein the low-concentration portion is formed in the at least one end portion in an absorption axis direction.

12. The polarizer according to claim 6, wherein the polarizer has formed therein the through-hole and the low-concentration portion is formed in the internal peripheral edge of the through-hole.

13. The polarizer according to claim 6, wherein the low-concentration portion is formed in the outer peripheral edge including the site that forms a substantially V-shape that is convexly curved in a plane direction.

14. A polarizing plate, comprising:
the polarizer of claim 1; and
a protective film arranged on at least one surface of the polarizer.

15. A method of producing a polarizer, comprising bringing a treatment liquid containing a substance that forms a counter ion of iodine into contact with a resin film containing iodine to form, in at least one end portion of the resin film, a high-concentration portion having a concentration of the substrate that forms a counter ion of iodine higher than that of another portion; and
forming the at least one end portion of the resin film, wherein the at least one end portion comprises an outer peripheral edge of the polarizer including a site forming a substantially V-shape that is convexly curved in a plane direction and/or an internal peripheral edge of a through hole, and wherein the polarizer has a polarization degree of 99.8% or more.

16. The production method according to claim 15, wherein the treatment liquid comprises a solution obtained by dissolving, in a solvent, a compound containing the substance that forms a counter ion of iodine.

17. The production method according to claim 16, wherein the compound contains at least one of potassium iodide or sodium chloride.

18. The production method according to claim 15, wherein the treatment liquid has a liquid temperature of 50° C. or more.

19. The production method according to claim 15, wherein forming the at least one end portion of the resin film comprises at least one of cutting or punching processing.

20. The production method according to claim 19, wherein the at least one of the cutting or the punching processing is performed by irradiating the resin film with laser light.

21. The production method according to claim 20, wherein the laser light comprises $CO_2$ laser light.

* * * * *